W. MAHONY.
SELF GRINDING VALVE.
APPLICATION FILED DEC. 16, 1913.

1,111,545.

Patented Sept. 22, 1914.

WITNESSES
L. H. Schmidt.
Myron G. Clear.

INVENTOR
WILLIAM MAHONY,
BY Munn & Co.
ATTORNEYS

UNITED STATES PATENT OFFICE.

WILLIAM MAHONY, OF HAMILTON, ONTARIO, CANADA.

SELF-GRINDING VALVE.

1,111,545.  Specification of Letters Patent.  Patented Sept. 22, 1914.

Application filed December 16, 1913. Serial No. 807,013.

*To all whom it may concern:*

Be it known that I, WILLIAM MAHONY, a citizen of the United States, and resident of Hamilton, in the Province of Ontario, in the Dominion of Canada, have invented an Improvement in Self-Grinding Valves, of which the following is a specification.

My present invention relates to self-grinding valves and particularly to the valves of internal combustion engines and of the type generally known as puppet valves, having rotatable and longitudinally movable stems mounted in parallelism, it being the object of my invention to so connect the valve stems by gearing as that they may be longitudinally moved by the usual cam tappets and rotation applied to one thereof will be communicated throughout the series.

A further object of my invention is to provide a clutch controlled connection between one of the valve stems and a source of power, preferably the main or crank shaft of the engine.

Figure 1:
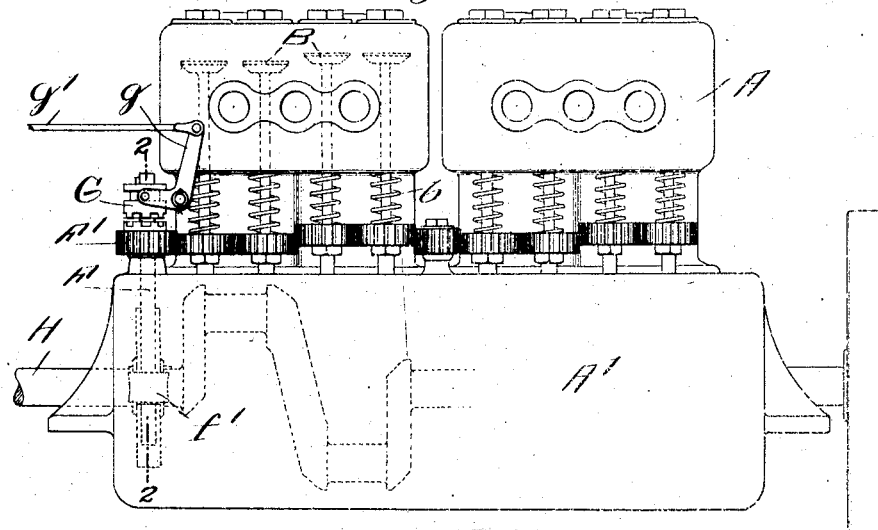
Figure 2:
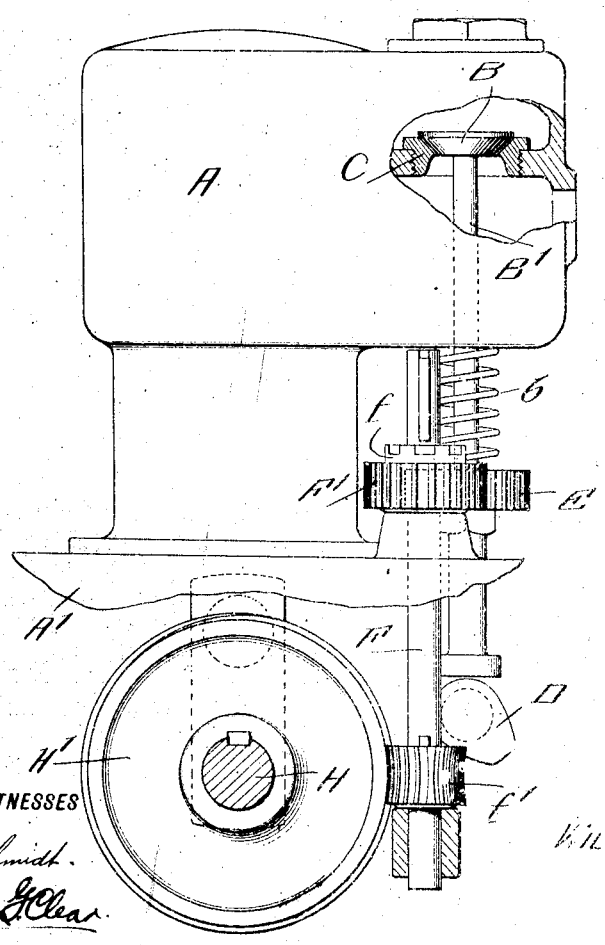

These objects and their resulting advantages will be better understood from the accompanying description in which reference is made to the drawing, forming a part of this specification and in which, Figure 1 is a side elevation of an engine to which my improvements have been applied, and Fig. 2 is an end elevation, on an enlarged scale, and partly broken away and in section to illustrate certain parts.

Referring now to these figures A indicates the several cylinders of an engine in connection with which a plurality of valves B indicated in dotted lines in Fig. 1 are utilized, these valves having their stems B′ mounted to move vertically and longitudinally so that the valves may be moved away from and onto their seats C, one of which is shown in Fig. 2. The several seats of the valves may be suitably formed, for instance threaded into position as illustrated in Fig. 2 in order that they may be readily removed for purposes of repair and substitution. The several stems B′ are provided with springs $b$ for maintaining the valves B on their seat and permit of their longitudinal movement under actuation of the usual cam tappets D one of which is shown in Fig. 2. It will also be noted that the several stems B′ are rotatable, and being arranged parallel with one another, may be connected by spur gears E secured thereon and intermeshing throughout the series, these spur gears being of sufficient width to permit of the seating and unseating of the valves without disengagement. In this manner the several valve stems may be rotated by rotary movement transmitted to one thereof either during the operation of the engine or while the parts are at rest and in order to effect this result in a simple manner I preferably mount a vertical shaft F through the crank case A′ of the engine, the upper exterior portion of this shaft having a spur gear F′ loosely mounted thereon and in mesh with the spur gear E of the adjacent valve stem B′, the upper portion of shaft F also supporting a splined clutch member G which may be moved through the medium of a bell crank lever G and connecting rod $g'$ so as to throw the clutch member G into engagement with the upper clutch face $f$ of the spur gear F′ from a distant point, at the will, and under the immediate control, of the operator. The shaft F is driven through a worm wheel $f'$ mounted upon its lower inner portion and in engagement with a worm H′ secured upon the main shaft H.

Thus the several valves may be quickly and effectively reground, cleaned and seated at various times during the operation of the engine and under the control of the operator without the use of an additional source of power, although it is within the province of the present invention to rotate the several valve stems through the use of suitable connections from the electric or air motor of a self-starter on automobiles and other motor vehicles if it is so desired.

I claim:

1. In an internal combustion engine, the combination of valves having rotatable and longitudinally movable stems arranged parallel with one another, spur gears secured on each of said stems and in mesh with one another therebetween, and forming a gearing connecting the stems and adapted to effect their rotation and permit of their longitudinal movement at the same time, and clutch control connections for rotating one of the valve stems, for the purpose described.

2. In an internal combustion engine the combination of a plurality of valves having rotatable and longitudinally movable stems arranged parallel with one another, intermeshing spur gears secured upon the said valve stems and of sufficient width to permit of longitudinal movement of said valve stems without disengaging the said gears, and clutch controlled connections for imparting rotation to one of the said valve stems, for the purpose described.

WILLIAM MAHONY.

Witnesses:
ELVA FRENCH,
NORMAN R. KAY.